US012775743B2

(12) United States Patent
Pouget-Abadie et al.

(10) Patent No.: US 12,775,743 B2
(45) Date of Patent: Oct. 27, 2026

(54) # PRIVACY-PRESERVING CAUSAL INFERENCE

(71) Applicant: GOOGLE LLC, Mountain View, CA (US)

(72) Inventors: Jean Guillaume Marc Marie Pouget-Abadie, New York, NY (US); Seyed Vahab Mirrokni Banadaki, Hoboken, NY (US); Adel Javanmard, Los Angeles, CA (US)

(73) Assignee: Google LLC, Mountain View, CA (US)

( * ) Notice: Subject to any disclaimer, the term of this patent is extended or adjusted under 35 U.S.C. 154(b) by 80 days.

(21) Appl. No.: 18/858,422

(22) PCT Filed: May 17, 2024

(86) PCT No.: PCT/US2024/029882
§ 371 (c)(1),
(2) Date: Oct. 21, 2024

(87) PCT Pub. No.: WO2024/238895
PCT Pub. Date: Nov. 21, 2024

(65) Prior Publication Data
US 2026/0187278 A1 Jul. 2, 2026

Related U.S. Application Data

(60) Provisional application No. 63/502,853, filed on May 17, 2023.

(51) Int. Cl.
*G06F 21/62* (2013.01)
*G06F 16/35* (2025.01)

(52) U.S. Cl.
CPC .......... *G06F 21/6254* (2013.01); *G06F 16/35* (2019.01)

(58) Field of Classification Search
CPC ..... G06F 21/6254; G06F 16/35; H04W 12/02
See application file for complete search history.

(56) References Cited

U.S. PATENT DOCUMENTS 8,627,488 B2 1/2014 Cormode et al.
10,390,220 B2 8/2019 Joy et al.
(Continued)

FOREIGN PATENT DOCUMENTS

CN 108537055 4/2022

OTHER PUBLICATIONS

International Preliminary Report on Patentability in International Appln. No. PCT/US2024/029882, mailed on Nov. 27, 2025, 8 pages.
(Continued)

*Primary Examiner* — Amir Mehrmanesh
*Assistant Examiner* — Thomas A Gyorfi
(74) *Attorney, Agent, or Firm* — Fish & Richardson P.C.

(57) ABSTRACT

In some aspects, a method includes receiving a treatment of an item that is to be tested on a plurality of users that are assigned to a plurality of clusters; providing, the item without the treatment to controlled users, and the item with the treatment to treated users; receiving a first set of responses from controlled users, and a second set of responses from treated users; for each cluster of users, identifying a first subset of responses received from controlled users in the cluster and a second subset of responses from treated users in the cluster; generating i) a first noise-added response distribution for the first subset of responses, and ii) a second noise-added response distribution for the second subset of responses; generating privatized responses by selecting either the response or a random sample from a particular noise-added response distribution; and providing the privatized responses to a treatment provider device.

20 Claims, 5 Drawing Sheets

(56) References Cited

U.S. PATENT DOCUMENTS

| | | | | |
|---|---|---|---|---|
| 11,341,281 | B2 | 5/2022 | Skourtis et al. | |
| 11,556,846 | B2 * | 1/2023 | Silberman | G06N 3/0455 |
| 11,698,990 | B2 | 7/2023 | McFall et al. | |
| 11,755,743 | B2 * | 9/2023 | Sharma | G06F 21/55 726/25 |
| 12,130,893 | B2 * | 10/2024 | Wang | G06F 21/6245 |
| 12,399,985 | B2 * | 8/2025 | Mohammady | G06F 21/6245 |
| 2016/0071170 | A1 | 3/2016 | Massoulie et al. | |
| 2022/0179971 | A1 * | 6/2022 | Ding | G06N 3/08 |
| 2022/0398460 | A1 * | 12/2022 | Dalli | G06F 18/2163 |
| 2023/0058219 | A1 | 2/2023 | Vinayagamurthy et al. | |

OTHER PUBLICATIONS

Bassily et al., "Model-agnostic private learning." Advances in neural information processing systems 31, 2018, 11 pages.

Beimel et al., "Private Learning and Sanitization: Pure vs. Approximate Differential Privacy" CoRR, Submitted on Jul. 2014, arXiv:1407.2674v1, 45 pages.

Brennan et al., "Cluster randomized designs for one-sided bipartite experiments." Advances in Neural Information Processing Systems 35, Dec. 2022, 13 pages.

Chaudhuri et al., "Sample complexity bounds for differentially private learning." Proceedings of the 24th Annual Conference on Learning Theory. JMLR Workshop and Conference Proceedings, Dec. 2011, 155-186.

Deng et al., "A data-driven metric of incentive compatibility." Proceedings of The Web Conference 2020, Apr. 2020, 1796-1806.

Deng et al., "Revenue-Incentive Tradeoffs in Dynamic Reserve Pricing" Proceedings of the 38th International Conference on Machine Learning, PMLR 139, 2021, 10 pages.

Dong et al., "Gaussian differential privacy." Journal of the Royal Statistical Society: Series B (Statistical Methodology) 84.1, Feb. 2022, 3-36.

Doudchenko et al., "Synthetic design: An optimization approach to experimental design with synthetic controls." Advances in Neural Information Processing Systems 34, Dec. 2021, 11 pages.

Dwork et al., "Calibrating noise to sensitivity in private data analysis" Paper, Presented at Theory of Cryptography: Third Theory of Cryptography Conference, TCC 2006, New York, NY, USA, Mar. 4-7, 2006, 20 pages.

Dwork et al., "Our data, ourselves: Privacy via distributed noise generation" Paper, Presented at Advances in Cryptology—EUROCRYPT 2006: 24th Annual International Conference on the Theory and Applications of Cryptographic Techniques, St. Petersburg, Russia, May 28-Jun. 1, 2006. Proceedings 25, 18 pages.

Dwork et al., "The algorithmic foundations of differential privacy." Foundations and Trends in Theoretical Computer Science 9.3-4, Aug. 2014, 281 pages.

Esfandiari et al., "Label differential privacy via clustering" CoRR, Submitted on Oct. 2021, arXiv:2110.02159v1, 24 pages.

Feng et al., "Reserve price optimization for first price auctions in display advertising" International Conference on Machine Learning. PMLR, Jul. 2021, 10 pages.

Feng et al., "Robust Clearing Price Mechanisms for Reserve Price Optimization" CoRR, Submitted on Jul. 2021, arXiv: 2107.04638v1, 18 pages.

Ghazi et al., "Deep learning with label differential privacy." Advances in neural information processing systems 34, Dec. 2021, 15 pages.

Ghazi et al., "Regression with label differential privacy" CoRR, Submitted on Dec. 2022, arXiv:2212.06074v1, 29 pages.

Harshaw et al., "Design and Analysis of Bipartite Experiments under a Linear Exposure-Response Model" CoRR, Submitted on Dec. 2021, arXiv:2103.06392v3, 40 pages.

International Search Report and Written Opinion in International Appln. No. PCT/US2024/029882, mailed on Sep. 30, 2024, 14 pages.

Kairouz et al., "The composition theorem for differential privacy." International conference on machine learning. PMLR, Jun. 2015, 10 pages.

Kancharla et al., "A Robust, Differentially Private Randomized Experiment for Evaluating Online Educational Programs With Sensitive Student Data" CoRR, Submitted on Dec. 2021, arXiv:2112.02452v1, 33 pages.

Li et al., "t-closeness: Privacy beyond k-anonymity and ℓ-diversity." 2007 IEEE 23rd international conference on data engineering. IEEE, Apr. 2006, 106-115.

Machanavajjhala et al., "ℓ-diversity: Privacy beyond k-anonymity" ACM Transactions on Knowledge Discovery from Data (TKDD), 1(1):3-es, Mar. 2007, 52 pages.

Munro et al., "Causal Estimation of User Learning in Personalized Systems" CoRR, Submitted on Jun. 2023, arXiv:2306.00485v1, 31 pages.

Narayanan et al., "Robust de-anonymization of large sparse datasets (How to Break Anonymity of the Netflix Prize Dataset)" CoRR, Submitted on Nov. 2007, arXiv:cs/0610105v2, 24 pages.

Ohnishi et al., "Locally Private Casual Inference" CoRR, Submitted on Jan. 2023, arXiv:2301.01616v1, 21 pages.

Pouget-Abadie et al., "Optimizing cluster-based randomized experiments under monotonicity." Proceedings of the 24th ACM SIGKDD International Conference on Knowledge Discovery & Data Mining, Jul. 2018, 2090-2099.

Pouget-Abadie et al., "Variance reduction in bipartite experiments through correlation clustering" Advances in Neural Information Processing Systems 32, 2019, 11 pages.

Privacytools.seas.harvard.edu [online], "Differential Privacy" Mar. 2015, retrieved on Apr. 17, 2025, retrieved from URL <https://privacytools.seas.harvard.edu/differential-privacy>, 3 pages.

Rehaut et al., "Causal Inference & Differential Privacy" REU 2016 Final Paper, Aug. 12, 2016, 28 pages.

Rolnick et al., "Randomized experimental design via geographic clustering." Paper, presented at KDD '19, Anchorage, AK, USA, Aug. 4-8, 2019, 2745-2753.

Sweeney, "k-anonymity: A model for protecting privacy." International journal of uncertainty, fuzziness and knowledge-based systems 10.05, Oct. 2002, 14 pages.

Sweeney, "Simple demographics often identify people uniquely." Health (San Francisco) 671.2000, Jan. 2000, 34 pages.

Wang et al., "On sparse linear regression in the local differential privacy model." International Conference on Machine Learning. PMLR, May 2019, 10 pages.

Wasserman et al., "A statistical framework for differential privacy" CoRR, Submitted on Oct. 2009, arXiv:0811.2501v2, 42 pages.

Wikipedia.org [online], "Differential privacy" created on Jul. 2009, retrieved on Apr. 17, 2025, retrieved from URL <https://en.wikipedia.org/wiki/Differential_privacy>, 12 pages.

Office Action in Indian Appln. No. 202517011866, mailed on Jul. 22, 2026, 9 pages (with English translation).

* cited by examiner

PRIVACY-PRESERVING CAUSAL INFERENCE

CROSS-REFERENCE TO RELATED APPLICATION

This application is a National Stage Application under 35 U.S.C. § 371 and claims the benefit of International Application No. PCT/US2024/029882, filed May 17, 2024, which claims priority to U.S. Provisional Patent Application No. 63/502,853, filed May 17, 2023, the disclosure of which is incorporated herein by reference.

TECHNICAL FIELD

This specification is related to data privacy and data security.

BACKGROUND

Causal inference is an area of research within statistics and data analysis that aims to establish cause-and-effect relationships between variables in a particular system. Its primary objective is to determine whether a change in one variable results in a corresponding change in another variable.

Differential privacy (DP) is a mechanism that allows the public sharing of dataset information by describing the patterns of groups in the dataset, while simultaneously preserving the confidentiality of individuals' data within the dataset.

SUMMARY

This specification describes technologies related to protecting the security and privacy of data.

In general, one innovative aspect of the subject matter described in this specification can be embodied in methods that include receiving, by a privacy preserving server and from a treatment provider device, a treatment of an item that is to be tested on a plurality of users that are assigned to a plurality of clusters; providing, a first version of the item without the treatment to a first group of controlled users, and a second version of the item with the treatment to a second group of treated users; receiving a first set of responses from the first group of controlled users, and a second set of responses from the second group of treated users; for each cluster of users of the plurality of clusters of users, identifying a first subset of the first set of responses received from first users assigned to the cluster, each first user being a controlled user in the first group of controlled users; identifying a second subset of the second set of responses from second users assigned to the cluster, each second user being in the second group of treated users; determining a first distribution of the first subset of responses, and a second distribution of the second subset of responses; adding first noise to the first distribution and second noise to the second distribution; and generating i) a first noise-added response distribution for the first subset of responses, and ii) a second noise-added response distribution for the second subset of responses; generating a set of privatized responses, including, for each response included in the first and second sets of responses, selecting either the response or a random sample from a particular noise-added response distribution generated for the cluster to which a user from which the response was received is assigned; and providing the set of privatized responses to the treatment provider device configured to derive a causal inference of the treatment using the set of privatized responses. Other implementations of this aspect include corresponding apparatus, systems, and computer programs, configured to perform the aspects of the methods, encoded on computer storage devices.

These and other implementations can each optionally include one or more of the following features. Some aspects include clustering a group of users into the plurality of clusters; selecting uniformly at random a predetermined number of users from each cluster to obtain the plurality of users; and dividing the plurality of users randomly into the first group of controlled users and the second group of treated users.

In some aspects, the plurality of users are clustered based on one or more attributes of the users. In some aspect, adding the first noise to the first distribution can include adding the first noise of a noise distribution with a first parameter to the first distribution for the controlled users in the cluster, and adding the second noise to the second distribution can include adding the second noise of the noise distribution with a second parameter to the second distribution for the treated users in the cluster.

In some aspects, the first parameter is determined using a number of controlled users in the cluster, and the second parameter is determined using a number of treated users in the cluster.

In some aspects, the noise distribution is Laplace distribution. In some aspects, the particular noise-added response distribution corresponds to 1) a user status indicating whether the user of the response is a controlled user or a treated user and 2) a cluster the user of the response belongs to.

In some aspects, selecting either the response or the random sample from the particular noise-added response distribution to obtain the privatized response can include: for each response included in the first set of responses, determining a particular cluster to which the user of the response is assigned, and selecting either the response or a random sample from the first noise-added response distribution of the particular cluster; and for each response included in the second set of responses, determining a particular cluster to which the user of the response is assigned, and selecting either the response or a random sample from the second noise-added response distribution of the particular cluster.

In some aspects, in each cluster, the first distribution includes a first set of empirical values for the first subset of responses from the controlled users in the cluster, and the second distribution includes one or more empirical values for the second subset of responses from the treated users in the cluster.

In some aspects, adding the first noise to the first distribution can include adding the first noise to the first set of empirical values, and adding the second noise to the second distribution can include adding the second noise to the second set of empirical values.

In some aspects, generating the first noise-added response distribution can include normalizing the noise-added first set of empirical values, and generating the second noise-added response distribution can include normalizing the noise-added second set of empirical values.

In some aspects, normalizing each noise-added set of empirical values can include: truncating the noise-added empirical values to obtain the truncated empirical values by comparing the noise-added empirical values to a threshold value and replacing the noise-added empirical values smaller than the threshold value with the threshold value; and normalizing the truncated empirical values to obtain the noise-added response distributions. In some aspects, the first noise and second noise is random noise or pseudo-random noise.

The subject matter described in this specification can be implemented in particular embodiments so as to realize one or more of the following advantages. The techniques described in this document use a cluster-based differential privacy approach, which generates a cluster structure based on data in a dataset and uses this cluster structure to reduce the variance of the estimators that estimate various parameters using the data while also maintaining data privacy and data security. Through the reduction of the variance of the estimators, the techniques described in this document can attain more precise estimations of causal inference than other differential privacy mechanisms that inject noise into a dataset, while still preserving data privacy and maintaining data security.

In some implementations, the differential privacy techniques described in this document involves adding noise to distributions of responses within clusters of data and processing the data in the clusters using renormalization and truncation techniques to reduce variances that would otherwise be injected into the data and ensuring that the data is label differentially private. The techniques can be used to improve the privacy-variance trade-off in various use cases, including in performing causal analyses. The data can be provided to another entity using probabilistic techniques that select, for each data item, between actual data and a sample from a distribution generated using the differential privacy techniques such that the recipient is unable to determine whether the data item is the actual data item or a sample, thereby further enhancing data privacy and security. As compared to other differential privacy techniques for causal inference, the techniques described in this document can achieve similar variance while transmitting less data between devices. The described techniques provide an improved bias-variance trade-off compared to other differential privacy techniques. For example, if the privacy loss and the number of users in an experiment are fixed, the described techniques provide an unbiased estimate of the average treatment effect that has lower variance compared to other differential privacy techniques. In other words, for a target level of variance, the described techniques involve a smaller number of users in the experiment than other experiment designs that involve differential privacy, resulting in less data being transferred between devices and less data being stored and processed for the experiment.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
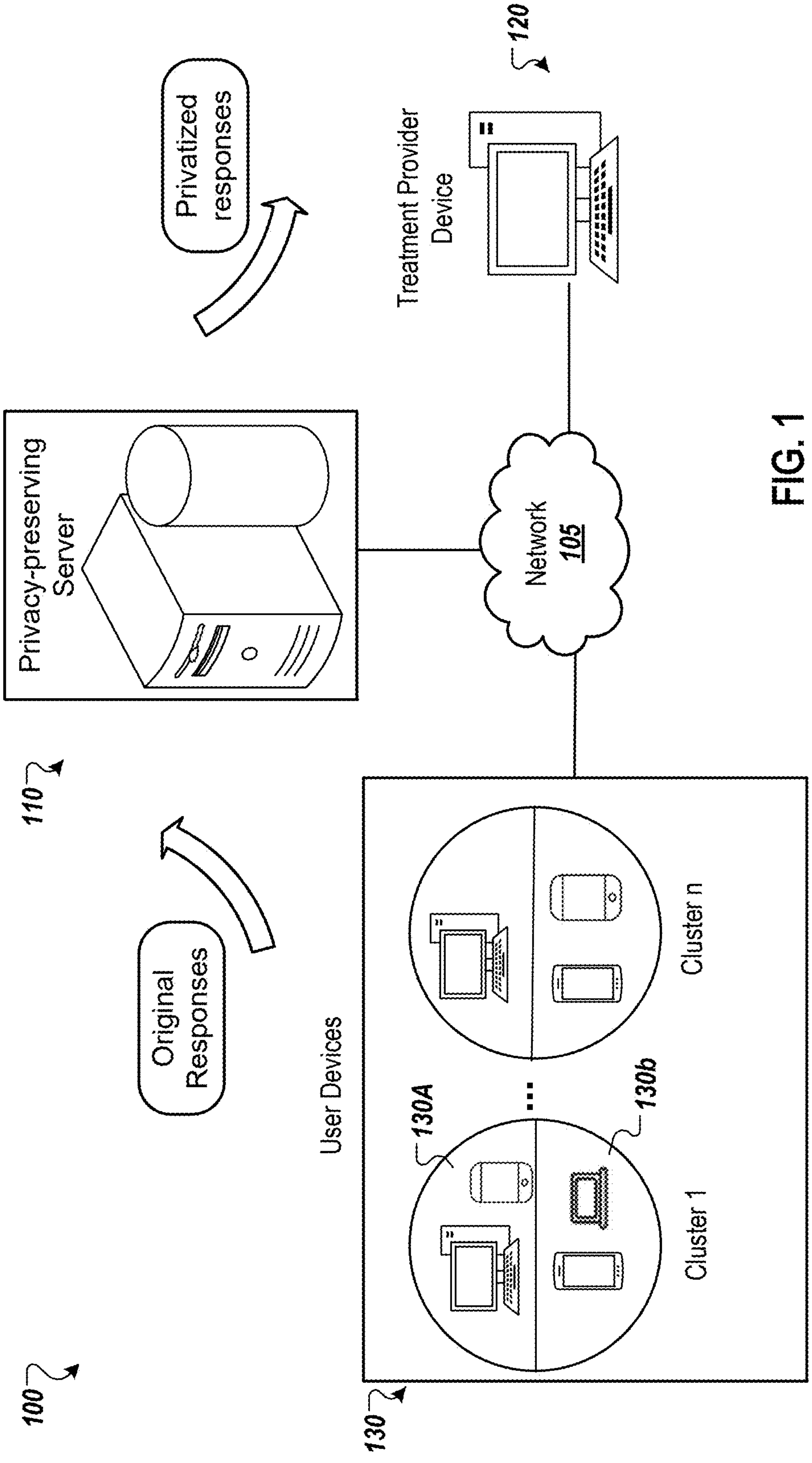
FIG. 1 is a block diagram of an example environment in which a privacy-preserving server performs cluster-based differential privacy processing.

Estimating causal effects from randomized experiments is only feasible if participants agree to reveal their potentially sensitive responses. Label differential privacy is a measure for preserving privacy, which may encourage participants to share responses or other outcomes or information without running the risk of de-anonymization. Some differentially private mechanisms inject noise into the original dataset to achieve privacy protection, which tends to increase the variance of most statistical estimators and makes the precise measurement of causal effects difficult.

In general, this document describes systems and techniques that employ a differential privacy mechanism that generates and leverages a cluster structure of data in a dataset to reduce the variance of the estimators, while preserving user data privacy and thereby encouraging users to allow their responses to be provided and used for analysis. By reducing the variance of the estimators, the technologies described herein can achieve more accurate estimation of the causal effects and involve fewer users in corresponding experiments, resulting in data transmission, data storage, and data processing reductions.

This document describes systems and techniques that can also employ randomization in each user's response to provide a "plausible deniability", meaning that the returned response can be linked to the randomization, rather than the actual response. This allows the users to freely respond to a treatment, while preserving their privacy. For example, the server can return either an actual outcome for a user or a sample from a transformed noise-added response distribution corresponding to a cluster that includes the user, to provide a privatized outcome. The server can use probabilistic techniques to select either the actual response or the sample for each user such that a recipient of the responses is not able to determine whether any user's response is the user's actual response.

Further to the descriptions throughout this document, a user may be provided with controls (e.g., user interface elements with which a user can interact) allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

FIG. 1 is a block diagram of an example environment 100 in which a privacy-preserving server 110 performs cluster-based differential privacy processing. The example environment 100 includes the privacy-preserving server 110, a treatment provider device 120, and user devices 130 that are connected over a data communication network 105. The network 105 can be a local area network (LAN), a wide area network (WAN), the Internet, a mobile network, or a combination thereof.

The privacy preserving server 110 can be operated by an entity that collects outcome information for experiments conducted for organizations and provides the outcome information to the organizations in a privacy preserving manner that prevents the organizations from learning how individual users responded to the experiments. Each organization can have a treatment provider device 120 that provides, to the privacy-preserving server 110, different versions of an item for use in conducting an experiment for the item.

The privacy-preserving server 110 may use a single server computer or multiple server computers operating in conjunction with one another, including, for example, a set of remote computers deployed as a cloud computing service. Other types of computers can also be used. The privacy-preserving server 110 can include one or more data processing apparatuses and several different functional components. The various functional components of the privacy-preserving server 110 may be installed on one or more computers as separate functional components or as different modules of a same functional component. For example, the different functional components can be implemented as computer programs installed on one or more computers in one or more locations that are coupled to each through a network. In cloud-based systems for example, these components can be implemented by individual computing nodes of a distributed computing system.

A user device 130 is an electronic device that is capable of communicating over the network 105. Example user devices 130 include personal computers, server computers, mobile communication devices, e.g., smart phones and/or tablet computers, and other devices that can send and receive data over the network 105. A user device 130 can also include a digital assistant device that accepts audio input through a microphone and outputs audio output through speakers. The digital assistant can be placed into listen mode (e.g., ready to accept audio input) when the digital assistant detects a "hotword" or "hotphrase" that activates the microphone to accept audio input. The digital assistant device can also include a camera and/or display to capture images and visually display information. The digital assistant can be implemented in different forms of hardware devices including, a wearable device (e.g., watch or glasses), a smart phone, a speaker device, a tablet device, or another hardware device. A user device 130 can also include a digital media device, e.g., a streaming device that plugs into a television or other display to stream videos to the television, a gaming device, or a virtual reality system.

A gaming device is a device that enables a user to engage in gaming applications, for example, in which the user has control over one or more characters, avatars, or other rendered content displayed in the gaming application. A gaming device typically includes a computer processor, a memory device, and a controller interface (either physical or visually rendered) that enables user control over content rendered by the gaming application. The gaming device can store and execute the gaming application locally, or execute a gaming application that is at least partly stored and/or served by a cloud server (e.g., online gaming applications). Similarly, the gaming device can interface with a gaming server that executes the gaming application and "streams" the gaming application to the gaming device. The gaming device may be a tablet device, mobile telecommunications device, a computer, or another device that performs other functions beyond executing the gaming application.

The privacy-preserving server 110 can receive a treatment of an item that is to be tested on or by a set of users. The privacy-preserving server 110 can receive the treatment from the treatment provider device 120. For example, the treatment provider can be an entity that wants to measure the effect of different variations of an item and that employs the privacy-preserving server 110 to distribute the variations of the item, outcome information related to users' responses to the variations, and provide the information to the device 120 of the treatment provider in a privacy preserving manner using differential privacy techniques described in this document. The treatment provider device 120 can use the information to evaluate the variations, e.g., by measuring the causal effects of the variations.

A treatment is a change to the item. In some examples, the item can be a web page, an application page, a game, a response of an artificial intelligence (AI) agent, a product, a medicine, a procedure, a feature, a digital component, or another type of item. The treatment can be a variation or change on the item that is being tested. For example, a standard version of a digital component can include text and an image. A treatment version of the digital component can include different text and/or a different image.

As used throughout this document, the phrase "digital component" refers to a discrete unit of digital content or digital information (e.g., a video clip, audio clip, multimedia clip, image, text, or another unit of content). A digital component can electronically be stored in a physical memory device as a single file or in a collection of files, and digital components can take the form of video files, audio files, multimedia files, image files, or text files and include advertising information, such that an advertisement is a type of digital component. For example, the digital component may be content that is intended to supplement content of a web page or other resource displayed by the user device 130. More specifically, the digital component may include digital content that is relevant to the resource content (e.g., the digital component may relate to the same topic as the web page content, or to a related topic). The provision of digital components can thus supplement, and generally enhance, the web page or application content.

The privacy-preserving server 110 can provide a first version of an item without a treatment and a second version of the item with the treatment to user devices 130 of multiple users over the network 105. By providing the first and second versions, the privacy-preserving server 110 can collect outcome information for the treatment for use in evaluating the treatment relative to the item without treatment. For example, the outcome information can be collected to measure the causal effect of applying the treatment to the item.

The outcome information can include, for example, responses of the users to the versions of the item that they receive. For some items, e.g., web pages, digital components, and games, the response can indicate whether the user interacted with (e.g., selected, downloaded, etc.) the item when the item was displayed to the user.

The users are divided into a first group of controlled users (e.g., control group) and a second group of treated users (e.g., treatment group). The privacy-preserving server 110 can divide the users into the control and treatment groups randomly, pseudo-randomly, or otherwise. The privacy-preserving server 110 provides the first version of the item without the treatment to user devices 130 of the first group of controlled users. The privacy-preserving server 110 provides the second version of the item with the treatment to user devices 130 of the second group of treated users.

The users are also assigned to clusters. For example, the privacy-preserving server 110 can assign the users to clusters based on information about the users such that each cluster includes a set of users that are determined to be similar and/or that share one or more common attributes. The one or more attributes can include, for example, geographic location (e.g., coarse location, such as country, state, city, or region), Internet Protocol (IP) address, age, gender, and/or other attributes. The privacy-preserving server 120 can evaluate the one or more attributes of the users and assign the users to clusters based on similarities between their attributes. By using the cluster structure, the techniques described in this document can use a cluster-based differential privacy approach to protect the users' private data while also reducing the variance of the estimators that estimate various parameters using the data.

In the example of FIG. 1, the users are assigned to n clusters: Cluster 1, Cluster 2, . . . . Cluster n, where n is a number greater than or equal to two. Each cluster includes multiple users. Within each cluster, a first set of controlled users' devices 130A receive the first version of the item (e.g., original version without the treatment and a second set of treated users' devices 130B receive the second version of the item (e.g., new version including the treatment). For example, the privacy preserving server 110 or the treatment provider device 120 can provide the first version of the item to the controlled users' devices 130A and the second version of the item to the treated users' devices 130B.

After receiving either the first version of the item or the second version of the item, each user can interact with (or not interact with) the item at their user devices 130. For example, each user device 130 can include an application (e.g., web browser or native application) that displays the item to the user. The application (or user device 105) can be configured to send the user's response to the privacy-preserving server 110. The response can indicate whether the user interacted with the item. For example, if the user does not interact with the item within a specified amount of time or if the user navigates from a web page or other resource that displays the item, the application or user device 105 can be configured to send a response indicating a non-interaction with the item. The privacy-preserving server 110 can receive the responses from the user devices 130. For example, the privacy-preserving server 110 can receive a first set of responses from the controlled users and a second set of responses from the treated users. These responses can be referred to as original responses as they can correctly reflect the users' responses without differential privacy techniques being applied at this stage.

The privacy-preserving server 110 can perform cluster-based differential privacy processing on the received original responses to obtain a set of privatized responses. More specifically, for each cluster, the privacy-preserving server 110 can identify a first subset of responses that are from the controlled users in that cluster, and a second subset of responses that are from the treated users in that cluster. For example, for Cluster 1, the privacy-preserving server 110 can identify the first subset of responses from controlled user devices 130A in Cluster 1, and the second subset of responses from treated user devices 130B in Cluster 1. The privacy-preserving server 110 can determine a first distribution of the first subset of responses and a second distribution of the second subset of responses. The privacy-preserving server 110 can add first noise to the first distribution and second noise to the second distribution. The privacy-preserving server 110 can generate a first noise-added response distribution for the first subset of responses, and a second noise-added response distribution for the second subset of responses. The privacy-preserving server 110 can perform the above processing for all the clusters, e.g., Cluster 1, Cluster 2, . . . , Cluster n.

Figure 2:
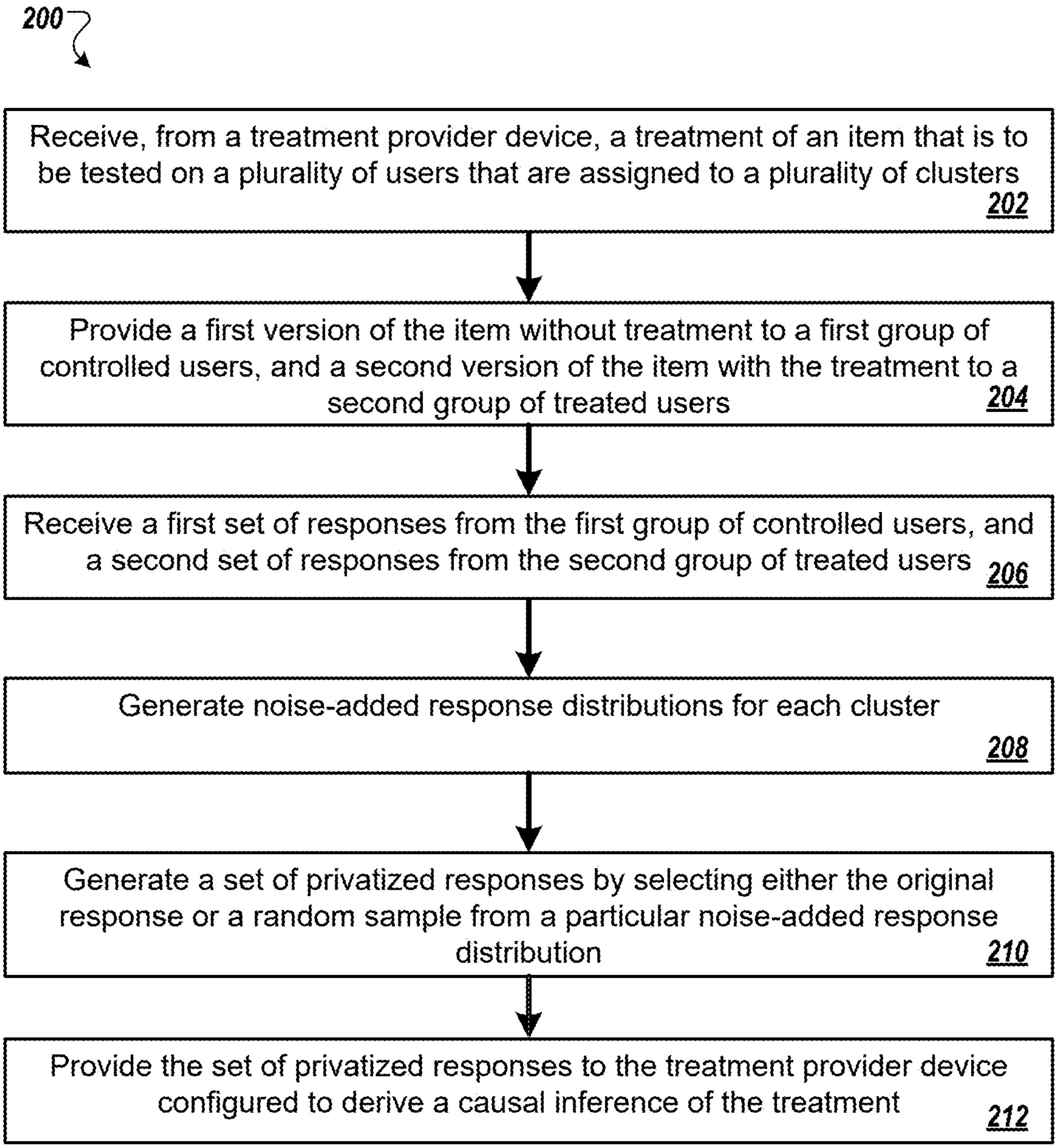
FIG. 2 is a flow diagram of an example process for cluster-based differential privacy processing.
Figure 3:
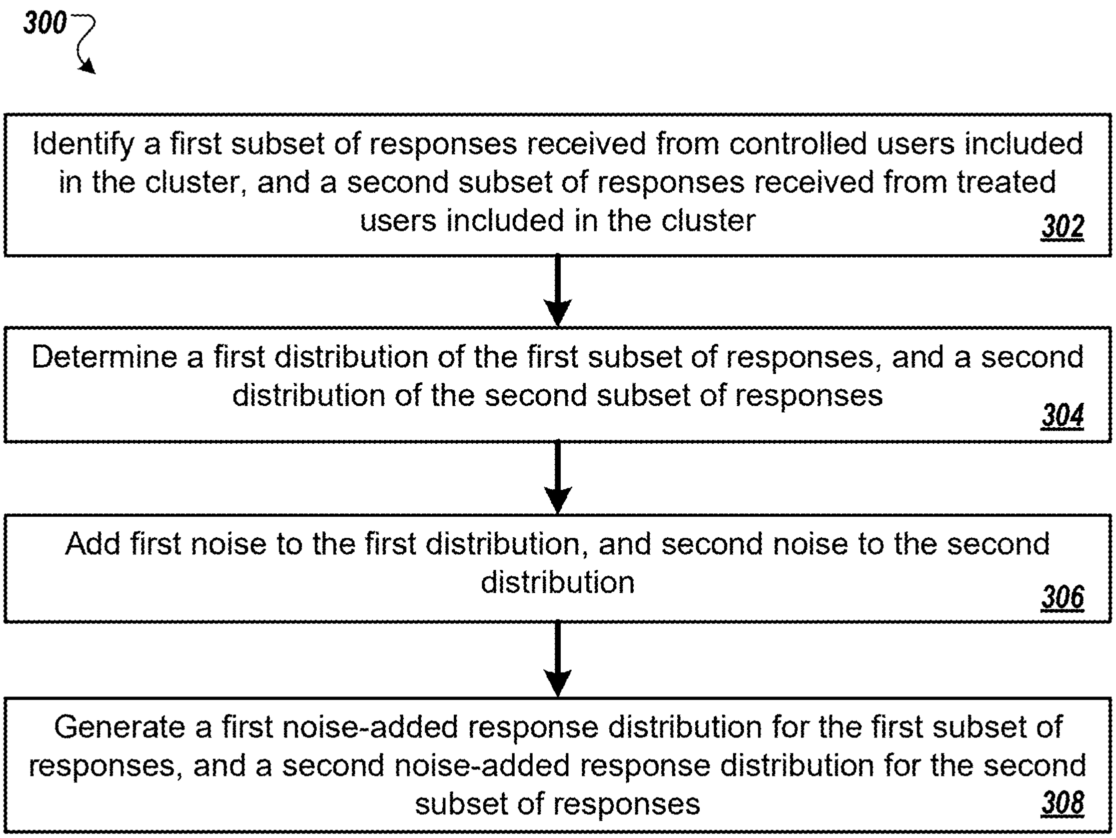
FIG. 3 is a flow diagram of an example process for generating noise-added response distributions.

The privacy-preserving server 110 can obtain a set of privatized responses by selecting, for each response, either the response (e.g., the original response) or a random sample from a particular noise-added response distribution generated for the cluster to which a user from which the response was received is assigned. For example, for each original response of the first subset of responses from the controlled user devices 130A in Cluster 1, the privacy-preserving server 110 can either select the original response, or select a random sample from the first noise-added response distribution for the responses from the controlled user devices 130A in Cluster 1. Example processes for cluster-based differential privacy processing are illustrated in FIGS. 2 and 3.

The privacy-preserving server 110 can send the privatized responses to the treatment provider device 120 over the network 105. The privatized responses provide privacy protection, because of the "plausible deniability", meaning that the returned response can be linked to the randomization, rather than the actual response. This allows the users to freely respond to the treatment without worrying about exposing their privacy. Based on the received privatized responses, the treatment provider device 120 can derive the causal inference of the treatment. That is, the treatment provider device 120 can determine the effectiveness of the treatment using privatized responses from both the control group and the treatment group.

The treatment provider device 120 or another device of an entity that provides an item for which an experiment is conducted using the techniques described in this document can use the results of the experiment (e.g., the results of the causal inference) to select variations of the item to distribute to users (e.g., to user devices 130 of the users). For example, if more users interact with a particular treatment for which an experiment is conducted, the treatment provider device 120 can provide that treatment more often than other treatments and/or more often than a control version of the item in the future.

The technologies described in this document can perform the cluster-based differential privacy processing to protect the privacy of users' responses, while allowing the causal inference to be derived. Furthermore, by performing the cluster-based differential privacy processing, the technologies described in this document can achieve more accurate estimation of the causal inference.

The more accurate casual inference can be used to distribute better performing variations of items which, when aggregated over many user devices 130, can result in substantial network bandwidth and data storage savings. For example, providing variations of digital content that users are interested in reduces wasted bandwidth consumption by not transmitting digital content that users are unlikely to view or interact with at their user devices. This also reduces the likelihood of a user rejecting a digital component in favor of a different digital component as well as avoiding the requirement of additional bandwidth for the delivery of the different digital components, the rendering resources and associated overheads, e.g., battery power drain, processor cycles and memory utilization at the client device would not be wasted on a rejected digital component.

The treatment provider device 120 can be an example of a system implemented as computer programs on one or more computers in one or more locations, in which the systems, components, and techniques described in this specification are implemented. The treatment provider device 120 may include a server computer, personal computers, mobile communication devices, and other devices that can send and receive data over a network 105.

FIG. 2 is a flow diagram of an example process 200 for cluster-based differential privacy processing. The process 200 can be performed by the privacy-preserving server 110 of FIG. 1. Operations of the process 200 can be performed by any appropriate device or system, e.g., any appropriate data processing apparatus. Operations of the process 200 can also be implemented as instructions stored on a computer readable medium, which may be non-transitory. Execution of the instructions cause one or more data processing apparatus to perform operations of the process 200. For brevity, the process 200 is described as being performed by a server.

At 202, the server receives, from a treatment provider device, a treatment of an item that is to be tested on a set of users that are assigned to multiple clusters.

The treatment can be a variation or change on the item that is being tested. For example, the treatment can be a modification of the item. In some examples, the treatment can be changing the layout of a web page, modifying the color of a button, or enabling an "auto play" function of a video website. The treatment provider device can provide a first version of the item without the treatment (e.g., item in original form), and a second version of the item with the treatment (e.g., item including the change).

The set of users are assigned to multiple clusters. The users can be clustered based on one or more attributes associated with each of the users. For example, the server can cluster a group of users based on similarities between their user attributes such that each cluster includes users that are determined to be similar to each other. In some implementations, the server can select uniformly at random a predetermined number of users from each cluster to obtain the plurality of users. In some implementations, the one or more attributes can be related to the treatment to be tested. For example, if the treatment to be tested is the "auto play" function of a video website, the users can be clustered based on the amount of time they spend on the website.

At 204, the server provides a first version of the item without treatment to a first group of controlled users, and a second version of the item with the treatment to a second group of treated users. The first version of the item is the original version of the item without the treatment. The second version of the item is the version of the item with the treatment.

The server divides the set of users into the first group of controlled users and the second group of treated users. The two groups can be used to compare the effects of a particular treatment on the item. The first group of controlled users is a control group of users in an experiment that do not receive the treatment being tested, e.g., receiving the first version without the treatment. The second group of treated users is a treatment group of users that receive the treatment being tested, e.g., receiving the second version including the treatment. The purpose of the control group is to provide a baseline for comparison with the treatment group. By keeping all (or at least some) other variables constant, except for the treatment being tested, it can be determined whether any observed changes are due to the treatment or some other factor. The purpose of the treatment group is to evaluate the effectiveness of the treatment for which the experiment is being performed.

The server can randomly assign the users to either the control group or the treatment group to ensure that any observed effects are not due to differences between the groups at the outset of the experiment.

At 206, the server receives a first set of responses from the first group of controlled users, and a second set of responses from the second group of treated users. The responses can be user interactions with the item observed for the control group and the treatment group. For example, the first set of responses can be control group users' interactions with the web page of the original version without the treatment. The second set of responses can be treatment group users' interactions with the web page of the new version with the treatment. The responses are included in a space of possible outcomes. For example, possible outcomes of the responses can include "not interested," "maybe interested," and "subscribe." In another example the response received from a user device of a user can indicate whether the user interacted with the item at the user device, as described above.

At 208, the server generates noise-added response distributions for each cluster. In some implementations, the server generates a first noise-added response distribution based on the responses received from the controlled users assigned to the cluster and a second noise-added response distribution based on the responses received from the treated users assigned to the cluster. The first noise-added response distribution represents the distribution of the outcomes represented by the responses of the controller users, but with noise added and/or other privacy preserving techniques being applied to the distribution. Similarly, the second noise-added response distribution represents the distribution of outcomes represented by the responses of the controller users, but with noise added and/or other privacy preserving techniques being applied to the distribution. An example process for generating the noise-added response distributions for a cluster is illustrated in FIG. 3 and described below.

At 210, the server generates a set of privatized responses. For each response received from the set of users, the server selects either the response (e.g., the original response) or a sample from a particular noise-added response distribution. For each response, the server can select, as the particular noise-added response distribution, either the first or second noise-added response distribution of the cluster to which the user corresponding to the response is assigned. If the user is a controlled user, the server can select, as the particular noise-added response distribution, the first noise-added response distribution of the cluster to which the user corresponding to the response is assigned. If the user is a treated user, the server can select, as the particular noise-added response distribution, the second noise-added response distribution of the cluster to which the user corresponding to the response is assigned. For example, the particular noise-added response distribution can correspond to a user status indicating i) whether the user of the response is a controlled user or a treated user and ii) a cluster to which the user is assigned.

That is, for each original response, the server selects i) either the original response or ii) a sample (e.g., random sample) from the noise-added response distribution of either the control group or the treatment group of the cluster including the user of the original response, depending on whether the user is in the control group or the treatment group of the cluster. The server selects the random sample with a predetermined probability of 2, and select the original response with a probability of 1-2.

More specifically, for each response included in the first set of responses from the controlled users, the server determines a particular cluster the user of the response belongs to, and selects either the response or a random sample from the first noise-added response distribution of the particular cluster that is obtained for the controlled users' responses. For each response included in the second set of responses from the treated users, the server determines a particular cluster to which the user of the response is assigned, and selects either the response or a random sample from the second noise-added response distribution of the particular cluster that is obtained for the treated users' responses.

To select a sample from the particular noise-added response distribution, the server selects a random response according to the particular noise-added response probability. For example, the noise-added response probabilities represented by a noise-added response distribution for a control group of Cluster 1 can be: 23% for "not interested," 29% for "maybe interested," and 48% for "subscribe." The server can select a "not interested" response with a probability of 23%, or select a "maybe interested" response with a probability of 29%, or select a "subscribe" response with a probability of 48%.

At 212, the server provides the set of privatized responses to the treatment provider device that is configured to derive a causal inference of treatment using the set of privatized responses. In some implementations, the server can return the privatized responses to the treatment provider device or a third-party server for further processing to derive the causal inference. For instance, the server can return the privatized responses to the provider of the to-be-tested-treatment so that the provider can determine the effectiveness of the treatment using privatized responses from both the control group and the treatment group.

The order of steps in the process 200 described above is illustrative only, and can be performed in different orders unless stated otherwise or logically implausible. In some implementations, the process 200 can include additional steps, fewer steps, or some of the steps can be divided into multiple steps.

FIG. 3 is a flow diagram of an example process 300 for generating noise-added response distributions. The process 300 can be performed by the privacy-preserving server 110 of FIG. 1. Operations of the process 300 can be performed by any appropriate device or system, e.g., any appropriate data processing apparatus. Operations of the process 300 can also be implemented as instructions stored on a computer readable medium, which may be non-transitory. Execution of the instructions cause one or more data processing apparatus to perform operations of the process 300. For brevity, the process 300 is described as being performed by a server.

At 302, the server identifies a first subset of responses received from controlled users included in the cluster. The server also identifies a second subset of responses received from treated users included in the cluster.

That is, the server identifies a first subset of the first set of responses received from first users assigned to the cluster, where each first user is a controlled user in the first group of controlled users. The server also identifies a second subset of the second set of responses from second users assigned to the cluster, where each second user is in the second group of the treated users.

At 304, the server determines a first distribution of the first subset of responses and a second distribution of the second subset of responses. The first distribution includes a first set of empirical values for the first subset of responses from the controlled users in the cluster. The second distribution includes one or more empirical values for the second subset of responses from the treated users in the cluster.

In some implementations, the empirical values can represent a response probability for each of the possible responses. For example, assuming there are three possible responses: "not interested," "maybe interested," and "subscribe," for each of the control group and the treatment group in each cluster. The server can determine a number of times each possible response was received. The server can also determine the response probability or response frequency of each possible response in a particular control/treatment group in a particular cluster based on the number of times each potential response was received. For example, the response probabilities in the control group of Cluster 1 can be: 20% for "not interested," 30% for "maybe interested," and 50% for "subscribe." In this example, 20% of the responses received from controlled users in Cluster 1 would have been "not interested." Similarly, 30% of the responses received from controlled users in Cluster 1 would have been "maybe interested" and 50% of the responses received from controlled users in Cluster 1 would have been "subscribe." That is, the first set of empirical values for the first subset of responses from the controlled users in Cluster 1 is 20% for "not interested," 30% for "maybe interested," and 50% for "subscribe."

At 306, the server adds first noise to the first distribution and adds second noise to the second distribution for the cluster. Adding the first noise to the first distribution includes adding the first noise to the first set of empirical values, and adding the second noise to the second distribution includes adding the second noise to the second set of empirical values. The first noise and second noise can be random noise or pseudo-random noise.

In some implementations, the server adds noise cluster by cluster. More specifically, for each cluster, the server adds noise to response distribution of the controlled users' responses and adds noise to response distribution of the treated users' responses in the cluster. Within each cluster, the server adds the noise to the controlled users' responses and the treated users' responses separately. The server also adds noise to each cluster individually, independent of each other.

For example, the following process is applied to a given cluster included in the multiple clusters. The same procedure is repeated for other clusters. The server adds the first noise of a noise distribution with a first parameter to the first empirical response distribution for responses of the controlled users in the cluster. The server adds the second noise of the noise distribution with a second parameter to the second empirical response distribution for responses of the treated users in the cluster. The first parameter is determined using a number of controlled users in the cluster, and the second parameter is determined using a number of treated users in the cluster.

In some implementations, the noise distribution can be based on a Laplace distribution. The Laplace distribution for the control group of the cluster (e.g., controlled users in the cluster) includes a first parameter $\sigma/n_{0,c}$, where $\sigma$ is a predetermined scale parameter for the added noise, and $n_{0,c}$ is the number of controlled users in the given cluster. The Laplace distribution for the treatment group of the cluster (e.g., treated users in the cluster) includes a second parameter $\sigma/n_{1,c}$, where $\sigma$ is the predetermined parameter, and $n_{1,c}$ is the number of treated users in the given cluster. Other distributions such as Gaussian distributions can also be used.

The server can compare empirical values (e.g., response probabilities) included in the noise-added distribution to a value of one. If an empirical value of the noise-added distribution is larger than 1, the server can replace the empirical value with the value of 1. For example, the server uses min {1, empirical values of noise-added distribution} to determine the empirical values of the noise-added distribution. As a result, server can make sure the empirical values of the noise-added distribution are still in the range of [0, 1].

At 308, the server generates a first noise-added response distribution for the first subset of responses (responses from the controlled users) and a second noise-added response distribution for the second subset of responses (responses from the treated users). Generating the first noise-added response distribution can include normalizing the noise-added first set of empirical values, e.g., empirical values for the controlled users' responses in the cluster. Generating the second noise-added response distribution can includes normalizing the noise-added second set of empirical values, e.g., empirical values for the treated users' responses in the cluster.

Normalization is the process of transforming a dataset or a feature vector so that it has a standard scale or range. A goal of normalization is to bring all features or variables to a similar scale, to avoid issues where some variables dominate over others due to their larger magnitude. Normalization is often used in data analysis to improve the accuracy of the analysis, as it can reduce the impact of outliers.

In some implementations, before the normalization, the server truncates the noise-added empirical values to obtain the truncated empirical values in a certain interval. For example, the server uses max {γ, noise-added empirical values} to truncate the noise-added empirical values. That is, the server can compare the noise-added empirical values to a threshold value γ. If the noise-added empirical value is less than γ, the server replaces the noise-added empirical value with γ.

In some examples, the noise-added empirical values (e.g., response probabilities) are in the range of [0, 1]. By truncating the noise-added empirical values, the noise-added empirical values are in the interval [γ, 1], $\gamma \in [0, 1/K]$, where K is the cardinality of the response space. The response space is the set of possible outcomes or responses that can be obtained from the plurality of users. In other words, it is the range of outcomes that can be observed or measured for the responses of the users to the to-be-tested treatment. For example, the first set of responses and the second set of responses are included in the response space.

In the truncating process, the server replaces the noise-added empirical values, which are less than the threshold value, with the threshold value. This can make sure that the values of the truncated empirical values are not too small. As a result, the statistical data (such as an average value) of the responses are less impacted by any individual response.

The server can transform the truncated empirical values so that they have a standard scale or range. In some implementations, the server normalizes the truncated empirical values (e.g., response probabilities) to make sure that the truncated response probabilities for the control group and the truncated response probabilities for the treatment group of the cluster remain in the range of [γ, 1], and also add up to one. In other words, the first noise-added response distribution for the control group of the cluster and the second noise-added response distribution for the treatment group of the cluster are within these constraints after normalization. For example, after adding the noise, the noise-added empirical values, e.g., the noise-added response probabilities, in the control group of Cluster 1 can be: 23% for "not interested," 29% for "maybe interested," and 48% for "subscribe."

In some implementations, the server can use the following process to perform the normalization of the truncated empirical values for each of the control group and the treatment group in the cluster. For brevity, this process is described in terms of the control group but the same process can be performed for the treatment group of the cluster. If the sum of the truncated empirical values $q_i$ in the control group of the cluster is greater than 1, an intermediate parameter $\zeta_i$ is determined for the truncated empirical value $q_i$ as $\zeta_i = q_i - \gamma$; otherwise, the intermediate parameter $\zeta_i$ for the truncated empirical value $q_i$ is determined as $\zeta_i = 1 - q_i$. The server can use the intermediate parameter $\zeta_i$ to normalize the truncated empirical values $q_i$ for the control group of the cluster using the Equation 1:

$$\tilde{q}_i = q_i + \frac{\zeta_i}{\sum \zeta_i}\left(1 - \sum q_i\right) \tag{1}$$

where $\tilde{q}_i$ is the normalized empirical value, $\Sigma\zeta_i$ is the sum of the intermediate parameters $\zeta_i$ in the control group of the cluster, and $\Sigma q_i$ is the sum of the truncated empirical values $q_i$ in the cluster. The normalized empirical values for the control group form the first noise-added response distribution for the cluster. The same process can be used to determine the second noise-added response distribution for the cluster using the truncated empirical values of the second cluster.

The order of steps in the process 300 described above is illustrative only, and can be performed in different orders unless stated otherwise or logically implausible. In some implementations, the process 300 can include additional steps, fewer steps, or some of the steps can be divided into multiple steps.

Figure 4:
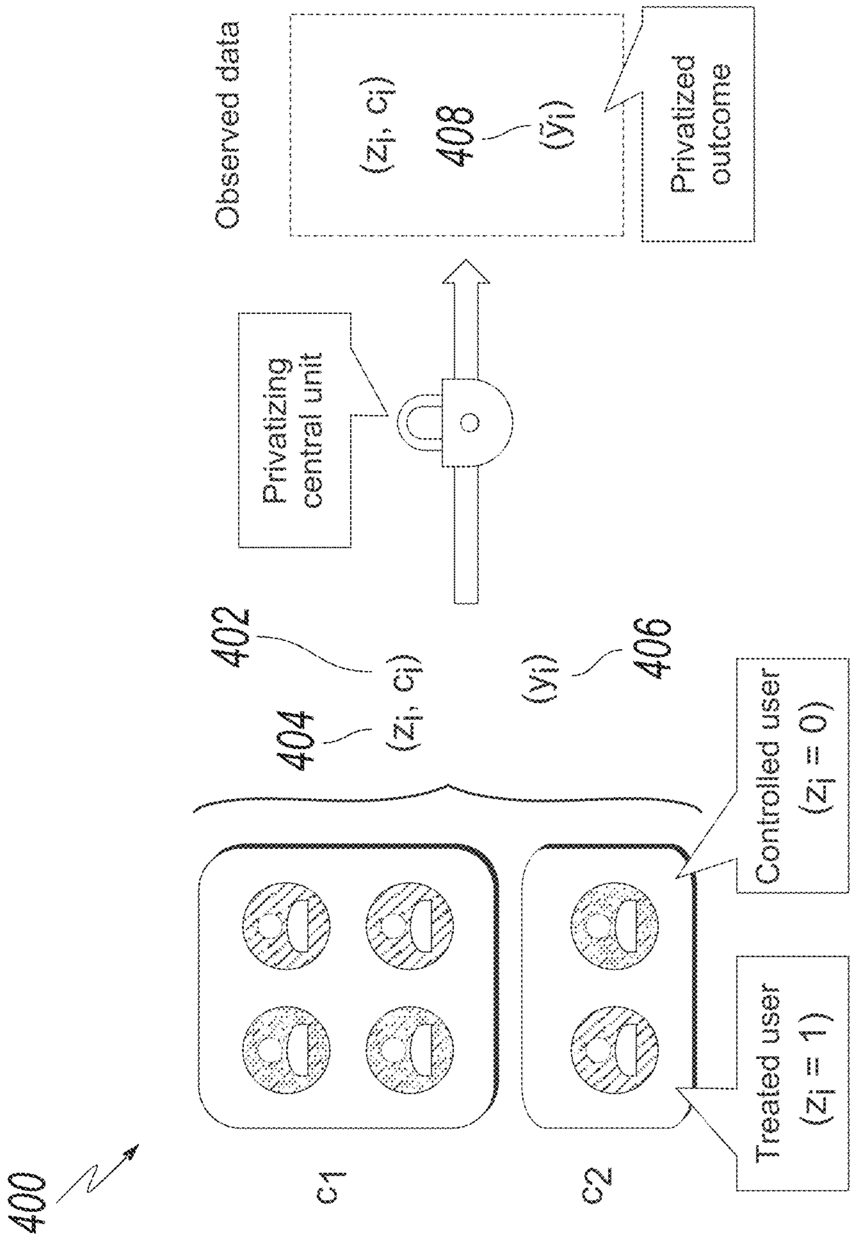
FIG. 4 is a block diagram of an example data flow of a process for cluster-based differential privacy processing.

FIG. 4 is a block diagram of an example data flow 400 of a process for cluster-based differential privacy processing. The example data flow 400 can be part of the process 200 of FIG. 2. The set of users are assigned to multiple clusters, c1, c2, and c3. Each user i is associated with a cluster identifier (ID) $c_i$ 402 for the cluster to which the user is assigned. For example, an identifier for each user can be mapped to a cluster ID in a database or other data structure. In each cluster, there is a first subset of users that are controlled users and a second subset of users that are treated users. The user status $z_i$ 404 indicates whether the user i is a controlled user or a treated user. The original response from the user i is represented as $y_i$ 406. To preserve the private original response $y_i$ 406, the server returns a privatized response $\tilde{y}_i$ 408. The privatized response $\tilde{y}_i$ 408 is obtained by selecting either the original response $y_i$ 406 or a random sample from a particular noise-added response distribution. The particular noise-added response distribution is determined based on the cluster identifier $c_i$ 402 for the user i, and the user status $z_i$ 404 indicating whether the user is a controlled user or a treated user. For example, if the user is a controlled user, the noise-added response distribution for the controlled users in the cluster that includes the user can be selected. If the user is a treated user, the noise-added response distribution for the treated users in the cluster that includes the user can be selected.

As a result, the privacy of the original response $y_i$ 406 is protected by returning the privatized response $\tilde{y}_i$ 408 that can be a random sample of the noise-added response distribution according to the user's cluster ID $c_i$ 402 and the user's control or treated status $z_i$ 404.

The set of privatized responses generated and provided using the techniques described herein can be used to determine causal effects of a treatment, e.g., by the treatment provider device 120. The estimand can be the average treatment effect $\tau$. An estimator $\hat{\tau}$ of the average treatment effect can be determined using the private responses ($\tilde{y}_i$), cluster assignments ($c_i$) for the privatized responses ($\tilde{y}_i$), and treatment assignment values ($z_i$) for the privatize responses (i). For each cluster, the treatment provider device 120 can construct response randomization matrices $Q_{c,a} \in \mathbb{R}^{K \times K}$ indexed by $a \in \{0,1\}$ using Equation 2:

$$Q_{c,a}[y', y] := (1-\lambda)\mathbb{1}(y' = y) + \lambda \tilde{q}_a(y' \mid c) \quad (2)$$

Condition on its true outcome ($y_i$), treatment assignment ($x_i$), and cluster assignment ($c_i$), privatized response ($\tilde{y}_i$) of user i is distributed according to $Q_{c_i,z_i}[\tilde{y}_i, y_i]$. The estimator $\hat{\tau}$ for the average treatment effect t can be determined using Equation 3:

$$\hat{\tau} := \sum_{c \in C} \frac{n_c}{n} \sum_{i \in c} \sum_{y' \in Y} y' \left( Q_{c_i z_i}^{-1}[y', \tilde{y}_i] \frac{z_i}{n_{1,c}} - Q_{c,1-z_i}^{-1}[y', \tilde{y}_i] \frac{1-z_i}{n_{0,c}} \right) \quad (3)$$

In this example, estimator $\hat{\tau}$ takes the form of a stratified Horvitz-Thompson estimator, where each privatized outcome is reweighted by the inverse of its conditional probability of occurring $Q_{c_1,z_i}[\tilde{y}_i', y_i]$. The privacy-preserving server 110 can provide, to the treatment provider device 120, the cluster assignment, the treatment assignment, and the privatized response for each response. In addition, the privacy-preserving server 110 can provide, to the treatment provider device 120, the vector of probabilities $$y^T Q_{c_i z_i}^{-1},$$

where $y = \{y \in Y\}$ is the vector of all possible responses.

Figure 5:
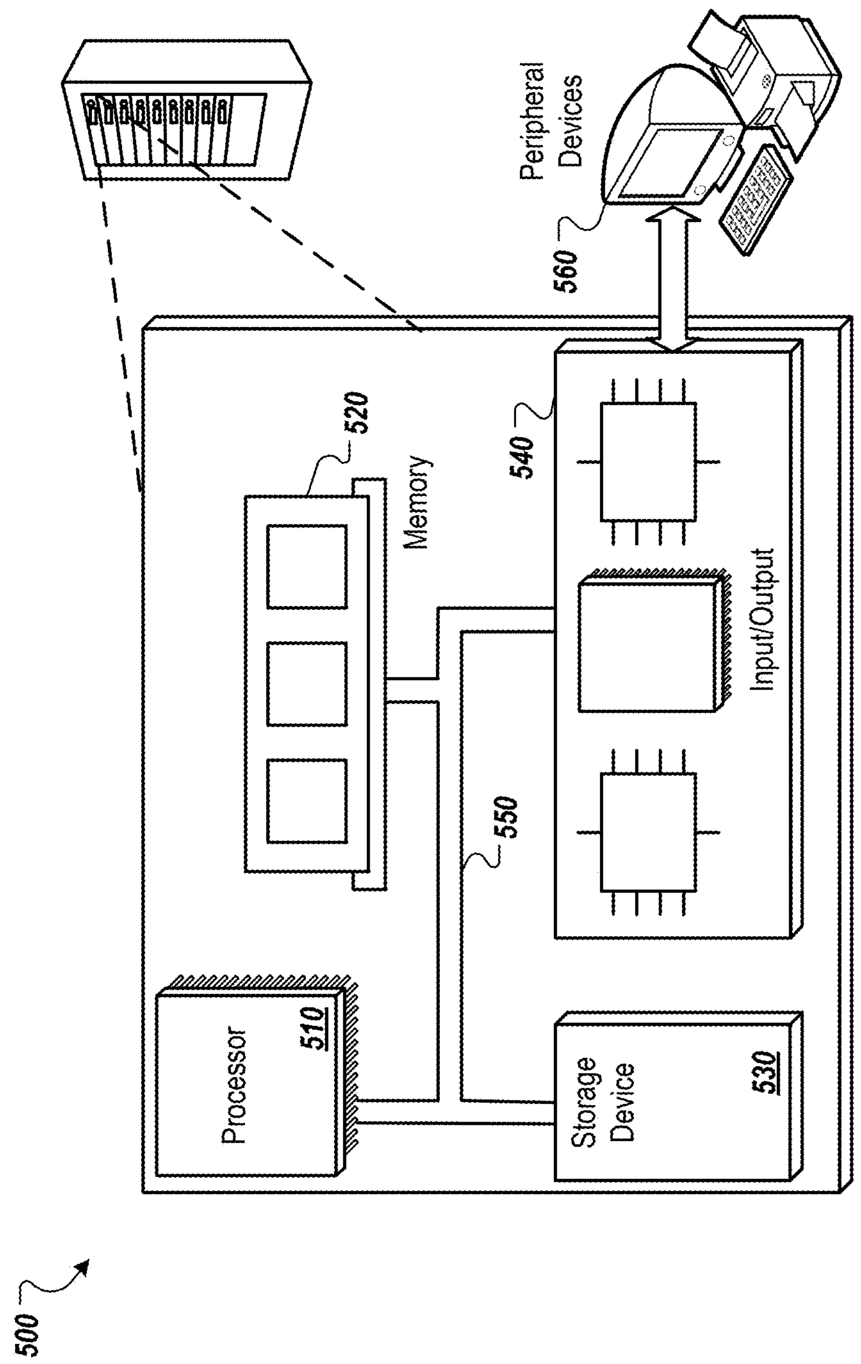
FIG. 5 is a block diagram of an example computer system.

FIG. 5 is a block diagram of an example computer system 500 that can be used to perform operations described above. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In some implementations, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In some implementations, the memory 520 is a volatile memory unit. In another implementation, the memory 520 is a non-volatile memory unit.

The storage device 530 is capable of providing mass storage for the system 500. In some implementations, the storage device 530 is a computer-readable medium. In various different implementations, the storage device 530 can include, for example, a hard disk device, an optical disk device, a storage device that is shared over a network by multiple computing devices (e.g., a cloud storage device), or some other large capacity storage device.

The input/output device 540 provides input/output operations for the system 500. In one implementation, the input/output device 540 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other devices, e.g., keyboard, printer, display, and other peripheral devices 560. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A method comprising:

receiving, by a privacy preserving server and from a treatment provider device, a treatment of an item that is to be tested on a plurality of users that are assigned to a plurality of clusters;

providing, a first version of the item without the treatment to a first group of controlled users, and a second version of the item with the treatment to a second group of treated users;

receiving a first set of responses from the first group of controlled users, and a second set of responses from the second group of treated users;

for each cluster of users of the plurality of clusters of users, identifying a first subset of the first set of responses received from first users assigned to the cluster, each first user being a controlled user in the first group of controlled users;

identifying a second subset of the second set of responses from second users assigned to the cluster, each second user being in the second group of treated users;

determining a first distribution of the first subset of responses, and a second distribution of the second subset of responses;

adding first noise to the first distribution and second noise to the second distribution; and generating i) a first noise-added response distribution for the first subset of responses, and ii) a second noise-added response distribution for the second subset of responses;

generating a set of privatized responses, including, for each response included in the first and second sets of responses, selecting either the response or a random sample from a particular noise-added response distribution generated for the cluster to which a user from which the response was received is assigned; and providing the set of privatized responses to the treatment provider device configured to derive a causal inference of the treatment using the set of privatized responses.

2. The method of claim 1, further comprising:

clustering a group of users into the plurality of clusters;

selecting uniformly at random a predetermined number of users from each cluster to obtain the plurality of users; and dividing the plurality of users randomly into the first group of controlled users and the second group of treated users.

3. The method of claim 1, wherein the plurality of users are clustered based on one or more attributes of the users.

4. The method of claim 1, wherein:

adding the first noise to the first distribution comprises adding the first noise of a noise distribution with a first parameter to the first distribution for the controlled users in the cluster, and adding the second noise to the second distribution comprises adding the second noise of the noise distribution with a second parameter to the second distribution for the treated users in the cluster.

5. The method of claim 4, wherein the first parameter is determined using a number of controlled users in the cluster, and the second parameter is determined using a number of treated users in the cluster.

6. The method of claim 4, wherein the noise distribution is Laplace distribution.

7. The method of any claim 1, wherein the particular noise-added response distribution corresponds to 1) a user status indicating whether the user of the response is a controlled user or a treated user and 2) a cluster the user of the response belongs to.

8. The method of claim 1, wherein selecting either the response or the random sample from the particular noise-added response distribution to obtain the privatized response comprises:

for each response included in the first set of responses, determining a particular cluster to which the user of the response is assigned, and selecting either the response or a random sample from the first noise-added response distribution of the particular cluster; and for each response included in the second set of responses, determining a particular cluster to which the user of the response is assigned, and selecting either the response or a random sample from the second noise-added response distribution of the particular cluster.

9. The method of claim 1, wherein, in each cluster, the first distribution includes a first set of empirical values for the first subset of responses from the controlled users in the cluster, and the second distribution includes one or more empirical values for the second subset of responses from the treated users in the cluster.

10. The method of claim 9, wherein:

adding the first noise to the first distribution comprises adding the first noise to the first set of empirical values, and adding the second noise to the second distribution comprises adding the second noise to the second set of empirical values.

11. The method of claim 10, wherein:

generating the first noise-added response distribution comprises normalizing the noise-added first set of empirical values, and generating the second noise-added response distribution comprises normalizing the noise-added second set of empirical values.

12. The method of claim 11, wherein normalizing each noise-added set of empirical values comprises:

truncating the noise-added empirical values to obtain the truncated empirical values by comparing the noise-added empirical values to a threshold value and replacing the noise-added empirical values smaller than the threshold value with the threshold value; and normalizing the truncated empirical values to obtain the noise-added response distributions.

13. The method of claim 1, wherein the first noise and second noise is random noise or pseudo-random noise.

14. A system comprising:

one or more processors; and one or more storage devices storing instructions that, when executed by the one or more processors, cause the one or more processors to carry out operations comprising:

receiving, by a privacy preserving server and from a treatment provider device, a treatment of an item that is to be tested on a plurality of users that are assigned to a plurality of clusters;

providing, a first version of the item without the treatment to a first group of controlled users, and a second version of the item with the treatment to a second group of treated users;

receiving a first set of responses from the first group of controlled users, and a second set of responses from the second group of treated users;

for each cluster of users of the plurality of clusters of users, identifying a first subset of the first set of responses received from first users assigned to the cluster, each first user being a controlled user in the first group of controlled users;

identifying a second subset of the second set of responses from second users assigned to the cluster, each second user being in the second group of treated users;

determining a first distribution of the first subset of responses, and a second distribution of the second subset of responses;

adding first noise to the first distribution and second noise to the second distribution; and generating i) a first noise-added response distribution for the first subset of responses, and ii) a second noise-added response distribution for the second subset of responses;

generating a set of privatized responses, including, for each response included in the first and second sets of responses, selecting either the response or a random sample from a particular noise-added response distribution generated for the cluster to which a user from which the response was received is assigned; and providing the set of privatized responses to the treatment provider device configured to derive a causal inference of the treatment using the set of privatized responses.

15. A non-transitory computer readable medium carrying instructions that, when executed by one or more processors, cause the one or more processors to carry out operations comprising:

receiving, by a privacy preserving server and from a treatment provider device, a treatment of an item that is to be tested on a plurality of users that are assigned to a plurality of clusters;

providing, a first version of the item without the treatment to a first group of controlled users, and a second version of the item with the treatment to a second group of treated users; receiving a first set of responses from the first group of controlled users, and a second set of responses from the second group of treated users;

for each cluster of users of the plurality of clusters of users, identifying a first subset of the first set of responses received from first users assigned to the cluster, each first user being a controlled user in the first group of controlled users;

identifying a second subset of the second set of responses from second users assigned to the cluster, each second user being in the second group of treated users;

determining a first distribution of the first subset of responses, and a second distribution of the second subset of responses;

adding first noise to the first distribution and second noise to the second distribution; and generating i) a first noise-added response distribution for the first subset of responses, and ii) a second noise-added response distribution for the second subset of responses;

generating a set of privatized responses, including, for each response included in the first and second sets of responses, selecting either the response or a random sample from a particular noise-added response distribution generated for the cluster to which a user from which the response was received is assigned; and providing the set of privatized responses to the treatment provider device configured to derive a causal inference of the treatment using the set of privatized responses.

16. The non-transitory computer readable medium of claim 15, wherein the instructions cause the one or more processors to carry out operations further comprising:

clustering a group of users into the plurality of clusters;

selecting uniformly at random a predetermined number of users from each cluster to obtain the plurality of users; and dividing the plurality of users randomly into the first group of controlled users and the second group of treated users.

17. The non-transitory computer readable medium of claim 15, wherein the plurality of users are clustered based on one or more attributes of the users.

18. The non-transitory computer readable medium of claim 15, wherein:

adding the first noise to the first distribution comprises adding the first noise of a noise distribution with a first parameter to the first distribution for the controlled users in the cluster, and adding the second noise to the second distribution comprises adding the second noise of the noise distribution with a second parameter to the second distribution for the treated users in the cluster.

19. The non-transitory computer readable medium of claim 18, wherein the first parameter is determined using a number of controlled users in the cluster, and the second parameter is determined using a number of treated users in the cluster.

20. The non-transitory computer readable medium of claim 18, wherein the noise distribution is Laplace distribution.

* * * * *